(12) United States Patent
Tsang

(10) Patent No.: US 9,902,352 B2
(45) Date of Patent: Feb. 27, 2018

(54) VEHICLE SIDE WING ANTI-COLLISION SYSTEM

(71) Applicant: Cheung Tsang, Hong Kong (HK)

(72) Inventor: Cheung Tsang, Hong Kong (HK)

( * ) Notice: Subject to any disclaimer, the term of this patent is extended or adjusted under 35 U.S.C. 154(b) by 0 days.

(21) Appl. No.: 15/316,839

(22) PCT Filed: Apr. 15, 2016

(86) PCT No.: PCT/CN2016/079472
§ 371 (c)(1),
(2) Date: Dec. 7, 2016

(87) PCT Pub. No.: WO2016/169442
PCT Pub. Date: Oct. 27, 2016

(65) Prior Publication Data
US 2017/0113639 A1    Apr. 27, 2017

(30) Foreign Application Priority Data

Apr. 22, 2015  (CN) .......................... 2015 1 0195049
Apr. 1, 2016   (CN) .......................... 2016 1 0204396

(51) Int. Cl.
*B60R 19/40*     (2006.01)
*B60R 19/02*     (2006.01)
(Continued)

(52) U.S. Cl.
CPC ............ *B60R 19/40* (2013.01); *B60R 19/023* (2013.01); *B60R 19/28* (2013.01); *B60R 19/42* (2013.01);
(Continued)

(58) Field of Classification Search
CPC ....... B60R 19/40; B60R 19/023; B60R 19/28; B60R 19/42; B60R 21/0132;
(Continued)

(56) References Cited

U.S. PATENT DOCUMENTS

| | | | |
|---|---|---|---|
| 1,523,978 A | * | 1/1925 | Rougeot ................. B60R 19/42 280/164.1 |
| 3,596,962 A | * | 8/1971 | Hertzell ................... B60R 13/04 293/128 |

(Continued)

FOREIGN PATENT DOCUMENTS

CN        103921747 A       7/2014

OTHER PUBLICATIONS

1st Office Action of counterpart Chinese Patent Application No. 201610204396.0 dated Jul. 14, 2017.

*Primary Examiner* — Paul N Dickson
*Assistant Examiner* — Timothy Wilhelm

(57) ABSTRACT

Disclosed is a vehicle side wing anti-collision system, including a telescopic assembly fixed on a vehicle frame; and a collision panel located in a groove of a vehicle side body and provided correspondingly to the telescopic assembly. The groove is provided with a connection hole and the telescopic assembly is extended out of the connection hole towards two sides in a transverse direction of the vehicle to drive the collision panel to extend out of the groove till protruding from the vehicle side body when the collision panel is subjected to a collision. Through the telescopic assembly and the collision panel, protection layers are formed on two sides of the vehicle, and thus the anti-collision ability of the vehicle side wing is enhanced.

12 Claims, 4 Drawing Sheets

(51) Int. Cl.
*B60R 19/42* (2006.01)
*B60R 19/28* (2006.01)

(52) U.S. Cl.
CPC ... *B60Y 2400/405* (2013.01); *B60Y 2400/406* (2013.01); *B60Y 2400/408* (2013.01)

(58) Field of Classification Search
CPC ........ B60Y 2400/408; B60Y 2400/406; B60Y 2400/405
See application file for complete search history.

(56) References Cited

U.S. PATENT DOCUMENTS

| | | | | |
|---|---|---|---|---|
| 3,718,357 A * | 2/1973 | Hertzell | ............... | B60R 13/04 293/128 |
| 3,983,963 A * | 10/1976 | Nakamura | ............... | F16F 7/123 188/377 |
| 4,995,659 A * | 2/1991 | Park | ............... | B60R 13/00 293/107 |
| 5,131,703 A * | 7/1992 | Stirling | ............... | B60R 19/02 280/163 |
| 5,464,266 A * | 11/1995 | Guertler | ............... | B60R 19/42 293/109 |
| 6,033,011 A * | 3/2000 | Kim | ............... | B60J 5/0427 296/146.6 |
| 6,227,583 B1 * | 5/2001 | Eipper | ............... | B60R 19/40 293/107 |
| 6,328,359 B1 * | 12/2001 | Pacella | ............... | B60J 5/0425 293/128 |
| 6,341,813 B1 * | 1/2002 | Taghaddos | ............... | B60R 19/00 293/107 |
| 6,417,764 B2 * | 7/2002 | Tonkin | ............... | B60Q 1/444 180/282 |
| 6,739,635 B2 * | 5/2004 | Byun | ............... | B60R 19/28 293/117 |
| 7,029,044 B2 * | 4/2006 | Browne | ............... | B60R 19/03 267/175 |
| 8,113,541 B2 * | 2/2012 | Mampe | ............... | B60R 21/0132 180/274 |
| 8,949,153 B2 * | 2/2015 | Holmes | ............... | B60R 19/023 280/735 |
| 2005/0067821 A1 * | 3/2005 | Reimer | ............... | B60R 21/0132 280/735 |
| 2005/0107933 A1 * | 5/2005 | Kuroda | ............... | B60R 21/0132 701/45 |

* cited by examiner

VEHICLE SIDE WING ANTI-COLLISION SYSTEM

TECHNICAL FIELD OF THE INVENTION

The present invention relates to vehicle field, and more particularly, to a vehicle side wing anti-collision system.

BACKGROUND OF THE INVENTION

Cars and large buses are common modern means of transport. Following the development of vehicles and the increase of their quantity, traffic accidents are also on the rise and seriously threaten human safety. According to the annual statistics reports on road traffic accidents of China, side collision accidents account for a large portion of traffic accidents in China and cause very high human casualties. Compared to vehicle head-on collision, vehicle side face is vulnerable to deformation when it is subjected to a collision, thereby directly injuring people in the vehicle.

Therefore, a new vehicle side wing anti-collision system is in urgent need to address the foregoing problem.

SUMMARY OF THE INVENTION

The object of the present invention is to provide a vehicle side wing anti-collision system and form protection layers on two sides of the vehicle by means of a telescopic assembly and a collision panel to improve the anti-collision performance of the vehicle side body.

The present invention provides a vehicle side wing anti-collision system, comprising:
 a telescopic assembly fixed on a vehicle frame; and
 a collision panel located in a groove of a vehicle side body and provided correspondingly to the telescopic assembly;
 wherein the groove is provided with a connection hole, and the telescopic assembly is extended out of the connection hole towards two sides in a transverse direction of the vehicle to drive the collision panel to extend out of the groove till protruding from the vehicle side body when the collision panel is subjected to a collision.

Further, the collision panel protruding from the vehicle side body is arranged to shape as an arc.

Further, the telescopic assembly comprises a telescopic pole and an operating box connected to the vehicle frame in a fixed manner; and the telescopic pole is located in the operating box, which is always trended to extend out of the operating box along its axial direction;

or, the telescopic assembly comprises a telescopic pole and a bearing frame connected to the vehicle frame in a fixed manner; and the telescopic pole is located in the bearing frame, which can be able to extend out of the bearing frame along its axial direction.

Further, the operating box comprises:
 a box body,
 a pneumatic cylinder disposed in the box body; and
 a pneumatic transmission pole disposed in the box body, an end which is connected to the pneumatic cylinder and the other end is connected to the telescopic pole; and wherein the pneumatic cylinder is able to drive the telescopic pole to extend out of the box body in an axial direction of the telescopic pole by means of the pneumatic transmission pole.

Further, the bearing frame comprises a frame body connected to the vehicle frame in a fixed manner, in which a division plate, a motor, a connecting rod having a rammer secured thereon in a fixed manner, a spring and an electric trigger are provided; the division plate and the motor being respectively connected to the frame body in a fixed manner;
 the motor being able to drive the connecting rod to approach the division plate;
 an end of the spring being fixed on the division plate and the other end being connected to the connecting rod by means of the electric trigger;
 an elastic member corresponding to the telescopic pole being disposed in the groove; the elastic member farther from one end of the frame body being connected to the collision panel in a fixed manner, allowing that the collision panel can be always trended to retract into the groove;
 a pole spring being sleeved outside the telescopic pole, allowing that the telescopic pole can be always trended to retract into the frame body;
 the electric trigger driving the connecting rod away from the division plate by means of the spring when the collision panel is subjected to a collision so that the rammer contacts the telescopic pole and drives the telescopic pole out of the frame body and consequently the collision panel extends out of the groove till protruding from the vehicle side body;
 a bearing and reinforcing body being disposed in the frame body which is disposed on a side of the rammer farther from the telescopic pole; wherein the rammer is able to move with the connecting rod along the bearing and reinforcing body.

Further, the telescopic assembly further comprises a controller for controlling the telescopic pole to extend out of or retract into the operating box or the bearing frame.

Further, the telescopic assembly comprises a first telescopic mechanism, and the collision panel comprises a front aux wing correspondingly which is located on a front fender of the vehicle.

Further, a first reinforcing beam is connected between support frames of the front fenders on the two sides of the vehicle; and wherein an end of the front aux wing nearer the vehicle head is articulated to the first reinforcing beam, and an end of the front aux wing farther from the vehicle head is connected to the front fender by the first elastic member.

Further, the telescopic assembly further comprises a second telescopic mechanism and the collision panel comprises a rear aux wing correspondingly which is located on a rear fender of the vehicle.

Further, a second reinforcing beam is connected between support frames of the rear fenders on the two sides of the vehicle; and wherein an end of the rear aux wing nearer the vehicle tail is articulated to the second reinforcing beam, and an end farther from the vehicle tail is connected to the rear fender by the second elastic member.

Further, the telescopic assembly further comprises a third telescopic mechanism, and the collision panel further comprises a main wing correspondingly which is located on a door outer panel of the vehicle; and wherein an end of the main wing is connected to an end of the door outer panel by a third elastic member, and the other end is connected to the other end of the door outer panel by a fourth elastic member.

Further, the door outer panel comprises a front door outer panel and a rear door outer panel and the main wing comprises a front main wing and a rear main wing;
 and wherein the third telescopic mechanism is fixed on a vehicle frame bottom plate to which center pillars on two sides of the vehicle correspond;
 and wherein an end of the front main wing is connected to an end of the front door outer panel by a fifth elastic member, the other end is connected to the other end of the front door outer panel by a sixth elastic member; and an end of the rear main wing is connected to an end of the rear door outer panel by a seventh elastic member, the other end is connected to the other end of the rear door outer panel by an eighth elastic member.

Further, the system further comprises a sensor assembly which is electrically connected to the controller, and used to generate an electrical signal and send it to the controller when the vehicle is subjected to a collision.

Further, after the front aux wing, the main wing and the rear aux wing are arranged into a seamlessly and smoothly connected integral arc-shaped protective body after they protrude from the vehicle side body.

Further, the telescopic assembly further comprises a controller which is electrically connected to the first telescopic mechanism, the second telescopic mechanism and the third telescopic mechanism respectively so as to drive the front aux wing, the rear aux wing and the main wing to independently extend out of the vehicle side body.

Further, the area of the collision panel is no less than 20% of the area of the corresponding vehicle side body.

In the vehicle side wing anti-collision system provided by the present invention, the telescopic assembly extends out towards two sides in a transverse direction of the vehicle, passes through the connection hole of a groove of the vehicle side body, contacts the collision panel, makes the collision panel extend out of the groove of the vehicle side body and protrude from the vehicle side body, and makes the collision panel form protection layers on the two sides of the vehicle to protect the vehicle side body being subjected to a collision or to be subjected to a collision, thereby effectively preventing the vehicle side body from being deformed by a collision, protecting the safety of people inside the vehicle and improving the anti-collision performance of the vehicle side body.

BRIEF DESCRIPTION OF THE DRAWINGS

In order to more clearly describe the embodiments of the present invention or the technical solutions in prior art, below the accompanying drawings that needed to be used in the description of embodiments or prior art are briefly introduced. Apparently, the accompanying drawings described below are some embodiments of the present invention. Those skilled in the art may also obtain other accompanying drawings based on these drawings without paying creative labor; wherein.

| Reference signs: | | |
|---|---|---|
| 1-telescopic assembly; | 11-telescopic pole; | 12-operating box; |
| 13-first telescopic mechanism; | 14-second telescopic mechanism; | |
| 15-third telescopic mechanism; | | |
| 2-collision panel; | 21-front aux wing; | 22-rear aux wing; |
| 23-main wing; | 24-front main wing; | 25-rear main wing; |
| 3-slipknot holder; | 31-pedestal; | 32-buckle; |
| 33-bolt; | | |
| 4-bearing frame; | 41-frame body; | 42-motor; |
| 43-connecting rod; | 44-spring; | 45-electric trigger; |
| 46-rammer; | 47-division plate; | 48-bearing and reinforcing body; |
| 5- pole spring; | 6- elastic member. | |

DETAILED DESCRIPTION OF THE INVENTION

Below the technical solutions of the present invention will be clearly and completely described by referring to accompanying drawings. Apparently, the embodiments described are only some rather than all of the embodiments of the present invention. All other embodiments obtained by those skilled in the art on the basis of the embodiments in the present invention without paying creative labor shall be in the protection scope of the present invention.

In the description of the present invention, it should be noted that the direction or position relations indicated by terms like "center", "above", "below", "left", "right", "vertical", "horizontal", "in" and "outside" are direction or position relations as shown in the accompanying drawings and only for making for and simplifying description of the present invention rather than express or imply the devices or components must be in the specific directions or must be structured and operated in the specific directions. Therefore, they shouldn't be understood as limitation to the present invention. Besides, terms "first", "second" and "third" are only used for the purpose of description rather than are understood to express or imply relative importance.

In the description of the present invention, it should be noted that unless otherwise explicitly specified and limited, terms "install", "communicate" and "connect" should be understood in a broad sense. For example, connection may be fixed connection, or detachable connection, or integrated connection; or mechanical connection or electrical connection; or direct connection; communication may be indirect communication via an intermediate medium or internal communication between two components. For those skilled in the art, the specific meanings of the above terms in the present invention may be understood according to the actual condition.

Embodiment 1

Figure 1:
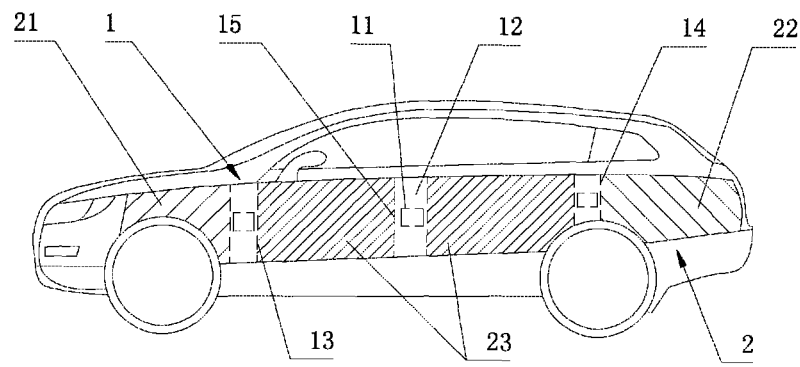
FIG. 1 is a front view of a vehicle side wing anti-collision system provided by Embodiment 1 of the present invention (operating box)
Figure 2:
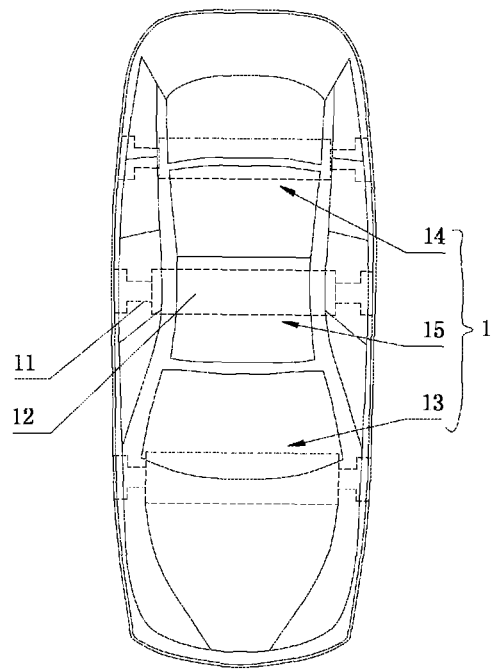
FIG. 2 is a top view of a vehicle side wing anti-collision system provided by Embodiment 1 of the present invention (operating box)
Figure 3:
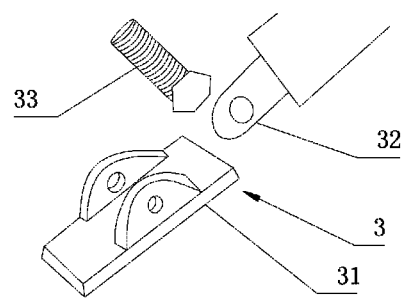
FIG. 3 is a perspective view of a slipknot holder of a vehicle side wing anti-collision system provided by Embodiment 1 of the present invention.
Figure 7:
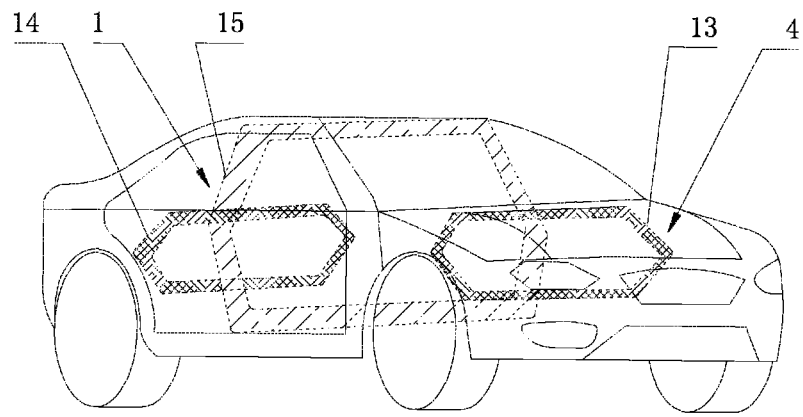
FIG. 7 is a perspective view of a vehicle side wing anti-collision system provided by Embodiment 1 of the present invention (bearing frame)
Figure 8:
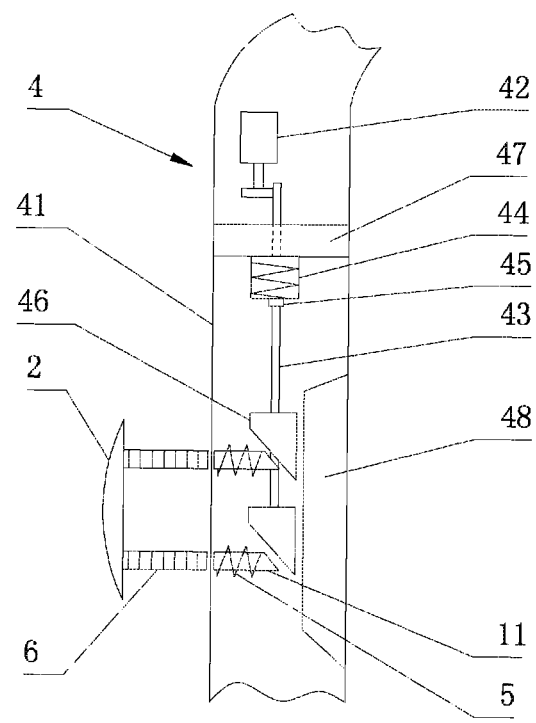
FIG. 8 is a schematic view of a bearing frame of a vehicle side wing anti-collision system provided by Embodiment 1 of the present invention.

As shown in FIG. 1-FIG. 3, FIG. 7 and FIG. 8, this embodiment provides a vehicle side wing anti-collision system. FIG. 1 and FIG. 2 show an operating box-type telescopic assembly. FIG. 1 is a front view of a vehicle side wing anti-collision system provided by this embodiment. The section lines therein are not for expressing section lines but for more clearly indicating front aux wing, rear aux wing, main wing and other structures. FIG. 2 is a top view of FIG. 1 and does not show the collision panel due to a different viewing angle. FIG. 3 is perspective view of a slipknot holder in this embodiment. FIG. 7 is a perspective view of a vehicle side wing anti-collision system with a bearing frame type telescopic assembly, and does not show a collision panel. FIG. 8 is a schematic view of a bearing frame. The term "bearing frame" herein means that the frame is able to bear external mechanical force, such as pressing or pulling force.

As shown in FIG. 1, FIG. 2 and FIG. 7, a vehicle side wing anti-collision system provided by this embodiment comprises a telescopic assembly 1 and a collision panel 2 provided correspondingly to the telescopic assembly 1.

The collision panel 2 is located in a groove of a vehicle side body, and the telescopic assembly 1 is fixed on a vehicle frame; the groove is provided with a connection hole; when the collision panel 2 is subjected to a collision, the telescopic assembly 1 extends out of the connection hole towards two sides in a transverse direction of the vehicle, drives the collision panel 2 out of the groove till protruding from the vehicle side body.

By load bearing form, vehicle bodies may be classified into non-bearing bodies and bearing bodies. When the vehicle adopts a non-bearing body, the vehicle frame in this embodiment does not comprise a chassis, and a bottom plate of the vehicle frame refers in particular to a bottom plate of the vehicle body; when the vehicle adopts a bearing body, the vehicle frame in this embodiment comprises a vehicle body and a bottom plate.

In this embodiment, the telescopic assembly 1 extends out towards two sides in a transverse direction of the vehicle, passes through the connection hole of a groove of the vehicle side body, contacts the collision panel 2, makes the collision panel 2 extend out of the groove of the vehicle side body and protrude from the vehicle side body, and makes the collision panel 2 form protection layers on two sides of the vehicle to protect the vehicle side body being subjected to a collision or to be subjected to a collision, thereby effectively preventing the vehicle side body from being deformed by a collision, protecting the safety of people inside the vehicle and improving the anti-collision performance of the vehicle side body.

The collision panel protruding from the vehicle side body may be arranged in a shape of arc, plate, broken line or curve for example, preferably, in a shape of arc or a shape similar to arc. In other words, the collision panel can be arranged into an arc-shaped protective body on both sides of the vehicle; the arc-shaped protective body of the collision panel formed on a vehicle side body being subjected to a collision or to be subjected to a collision makes the two sides of the vehicle relatively smooth and free from any protruding obtuse angle, thereby making the vehicle glide away from the struck body to reduce injury and enhance impact resistance of the collision panel. Optionally, the area of the collision panel is not less than 20% of the area of the vehicle side body; in other words, the area of the collision panel on a vehicle side body on one side of the vehicle is not less than 20% of the area of the vehicle side body; the area of a collision panel may be 20%-90% of the area of the corresponding vehicle side body. The collision panel may comprise one or a plurality of collision panel portions. A plurality of collision panel portions can be arranged into a seamlessly and smoothly connected integral arc-shaped protective body or an arc-shaped protective body with seams as intervals on both sides of the vehicle. It should be noted that collision panel portions for example may be front aux wing, rear aux wing, main wing, and so on, in the present application. In other words, after the front aux wing, the main wing and the rear aux wing protrude from the vehicle side body, they are arranged from head to tail consistently into a seamlessly and smoothly connected integral arc-shaped protective body.

As shown in FIG. 1 and FIG. 2, in a solution of this embodiment, the telescopic assembly 1 comprises a telescopic pole 11 and an operating box 12; the telescopic pole 11 is located in the operating box 12 and always tends to extend out of the operating box 12 in its axial direction; the operating box 12 is connected to the vehicle frame in a fixed manner. Concretely speaking, the operating box 12 may be connected to the vehicle body of the vehicle frame in a fixed manner, or connected to the bottom plate of the vehicle frame in a fixed manner, or jointly connected to the vehicle body and bottom plate of the vehicle frame in a fixed manner; preferably, the operating box 12 is connected to the bottom plate of the vehicle frame, or is connected to the part of the vehicle frame nearer the bottom plate in a fixed manner. The telescopic pole 11 extends out of the operating box 12 in its axial direction, passes through the connection hole, contacts the collision panel 2 and makes the collision panel 2 extend out of the groove of the vehicle side body.

The way that the telescopic pole extends out of the operating box may be mechanical, hydraulic, pneumatic, or any other way that enables the telescopic pole to extend and retract freely; in other words, inside the operating box, there may be a motor, a hydraulic cylinder or a pneumatic cylinder and other parts and components that can drive the telescopic pole out of the operating box. Preferably, the telescopic pole extends mechanically out of the operating box so that it can give quick response and extends out of the operating box at the moment when the vehicle is being subjected to a collision or is about to be subjected to a collision, and subsequently drives the collision panel to protrude from the vehicle side body and forms protection layers comprising the collision panel on the two sides of the vehicle, thereby protecting the safety of the people inside the vehicle. As a vehicle is subjected to a collision at a very short time, the response time of the collision panel by protruding from the vehicle side body under the drive of the telescopic pole of the telescopic assembly is very short. Preferably, the response time is less than 0.1 s.

Preferably, the operating box comprises a box body, a pneumatic cylinder and a pneumatic transmission pole; the pneumatic cylinder and the pneumatic transmission pole are disposed inside the box body; an end of the pneumatic transmission pole is connected to the pneumatic cylinder and the other end is connected to the telescopic pole; by means of the pneumatic transmission pole, the pneumatic cylinder can drive the telescopic pole to extend out of the box body in an axial direction of the telescopic pole, pass through the connection hole, contact the collision panel and drive it out of the groove till protruding from the vehicle side body.

The operating box is connected onto the vehicle frame in a fixed manner. Its shape and size are designed according to the space inside the vehicle frame and not limited to a specific shape and size.

As shown in FIG. 7 and FIG. 8, in the vehicle side wing anti-collision system provided by this embodiment, the telescopic assembly 1 comprises a telescopic pole 11 and a bearing frame 4. The telescopic pole 11 is located in the bearing frame 4 and can extend out of the bearing frame 4 in its axial direction. In concrete implementation, the telescopic pole 11 may be completely located in the frame body 41 and can partially or completely extend out of the frame body 41, or is partially located in the telescopic pole 11 and can continue to extend outwards the frame body by a specific length, or a seriated spring retractor coordinate with a seriated telescopic pole 11 to substitute the work task of a pole spring 5. The bearing frame 4 is connected to the vehicle frame in a fixed manner; concretely speaking, the bearing frame 4 may be connected to the vehicle body of the vehicle frame in a fixed manner, or connected to the bottom plate of the vehicle frame in a fixed manner, or jointly connected to the vehicle body and the bottom plate of the vehicle frame in a fixed manner; preferably, the bearing frame 4 is jointly connected to the vehicle body and the bottom plate of the vehicle frame in a fixed manner. The telescopic pole 11 extends out of the bearing frame 4 in its axial direction, contacts the collision panel 2 and makes the collision panel 2 extend out of the groove of the vehicle side body.

Optionally, as shown in FIG. 8, the bearing frame 4 comprises a frame body 41. A division plate 47, a motor 42, a connecting rod 43, a spring 44 and an electric trigger 45 are disposed inside the frame body 41 connected to the vehicle frame in a fixed manner. Preferably, the frame body 41 is jointly connected to the vehicle body and the bottom plate of the vehicle frame in a fixed manner. The division plate 47 and the motor 42 are respectively connected to the frame body 41 in a fixed manner. Preferably, the division plate 47 is located in the frame body 41, and the frame body 41 is connected to the vehicle frame in a fixed manner; wherein, the thickness range of the division plate 47 may be 80 mm-150 mm to raise the strength of the division plate 47 and enable it to provide powerful support for a spring 44. A rammer 46 is disposed on the connecting rod 43 in a fixed manner so that the rammer 46 moves with the connecting rod 43.

The motor 42 can drive the connecting rod 43 to approach the division plate 47 to compress the spring 44 so that the spring 44 accumulates elastic potential energy.

An end of the spring 44 is fixed onto the division plate 47, and the other end of the spring 44 is connected to the connecting rod 43 by means of the electric trigger 45. The electric trigger 45 can trigger the spring 44 so that the spring 44 releases elastic potential energy and quickly drives the connecting rod 43 to move.

An elastic member 6 corresponding to a telescopic pole 11 is disposed inside the groove; an end of the elastic member 6 farther from the frame body 41 is connected to the collision panel 2 in a fixed manner so that the collision panel 2 always tends to retract into the groove, and used for automatic reset of the collision panel.

A pole spring 5 is sleeved outside the telescopic pole 11. The elastic potential energy of the pole spring 5 makes the telescopic pole 11 always tend to retract into the frame body 41, and is used for automatic reset of the telescopic pole.

When the collision panel 2 is subjected to a collision, the electric trigger 45 drives the connecting rod 43 away from the division plate 47 by means of releasing elastic potential energy of the spring 44 so that the rammer 46 contacts the telescopic pole 11, and drives it to extend out of the frame body 41, pass through the connection hole, contact the collision panel 2 and drive the collision panel 2 out of the groove till protruding from the vehicle side body. The rammer 46 may drive the telescopic pole through a wedge-shaped structure for example as shown in the drawing.

When the threat of a vehicle from subjection to a collision is dissolved, the motor 42 drives the connecting rod 43 to approach the division plate 47, the rammer moves with the connecting rod 43 and away from the telescopic pole 11, the elastic member 6 drives the collision panel 2 to retract into the groove to realize automatic reset of the collision panel 2, and the pole spring 5 drives the telescopic pole 11 to retract into the frame body 41 to realize automatic reset of the telescopic pole 11.

Preferably, a bearing and reinforcing body 48 is disposed inside the frame body 41 in a fixed manner, and on a side of the telescopic pole 11 farther from the rammer 46; the rammer 46 can move with the connecting rod 43 along the bearing and reinforcing body 48, in other words, the movement path of the rammer 46 adapts to the bearing and reinforcing body 48. The support force of the bearing and reinforcing body 48 provided for the rammer 46 enables the telescopic pole 11 to extend out of the frame body 41. Preferably, the contact surface between the rammer 46 and the telescopic pole 11 is an inclined plane or an approximately inclined plane. The quantity of the rammers 46 corresponds to the quantity of the telescopic poles 11, in other words, if there are a plurality of the telescopic poles 11, the rammers 46 will be as many as the telescopic poles 11 to raise the speed of the collision panel 2 for extending out of the groove.

Further, the motor 42 drives the connecting rod 43 to approach the division plate 47 by means of worm and gear, bevel gear pair, conical gear pair and other transmission connectors to take back the connecting rod 43 and make the connecting rod 43 no longer act upon the telescopic pole 11 so that the collision panel 2 retracts into the groove under the action of elastic restoring force of the elastic member 6. The elastic member 6 may be a first elastic member, a second elastic member, a third elastic member, a fourth elastic member, a fifth elastic member, a sixth elastic member, a seventh elastic member or an eighth elastic member in the present application for example.

The shape and size of the bearing frame 4 are designed according to the space inside the vehicle frame and not limited to a specific shape and size. Preferably, the bearing frame 4 is arranged in the transverse direction of the vehicle and is in a shape of rectangle, circular truncated cone or hexagon. Further, the bearing frame 4 is connected to one or a plurality of the top, bottom and two sides of the vehicle frame. Preferably, the bearing frame 4 is connected to all of the top, bottom and two sides of the vehicle frame in a fixed manner to make the connection between the bearing frame 4 and the vehicle frame even firmer and subsequently facilitate the bearing frame 4 to drive the collision panel 2 out of the groove of the vehicle side body by driving the telescopic pole 11.

It should be noted that a telescopic assembly with an operating box and a telescopic assembly with a bearing frame are two parallel solutions of a telescopic assembly and are mutually substitutable. Compared with the operating box, the bearing frame occupies a smaller internal space of the vehicle. The bearing frame is in a frame structure and connected to the vehicle frame. Its interior is hollow. Basically it does not affect the slide of vehicle seats inside the vehicle and the lie-low of vehicle seat backs, greatly improves the problem of the operating box which occupies vehicle's internal space near the bottom plate, making vehicle seats unable to slide and vehicle seat backs unable to be laid low. In the present application, a first telescopic mechanism, a second telescopic mechanism and a third telescopic mechanism may respectively be telescopic assemblies with an operating box, or respectively be telescopic assemblies with a bearing frame. In other words, when the collision panel is subjected to a collision, the telescopic poles of the first telescopic mechanism, the second telescopic mechanism and the third telescopic mechanism extend out of the box bodies or the frame bodies, pass through the connection holes, and drive the collision panel out of the groove till protruding from the vehicle side body.

As shown in FIG. 1, FIG. 2 and FIG. 7, in an optional solution of this embodiment, the telescopic assembly 1 comprises a first telescopic mechanism 13, and correspondingly, the collision panel 2 comprises a front aux wing 21; the front aux wing 21 is located on a front fender of the vehicle so as to drive the front aux wing 21 to extend out and protrude from the front fender by means of the first telescopic mechanism 13, thereby protecting the front fender being subjected to or to be subjected to a collision, and subsequently effectively preventing the vehicle parts and components inside the front fender from being damaged during subjection to the collision.

Concretely speaking, the front aux wing 21 is located in a groove of the front fender; when the collision panel 2 is subjected to a collision, the first telescopic mechanism 13 extends out of a connection hole of the groove of the front fender towards two sides in a transverse direction of the vehicle, and contacts and drives the front aux wing 21 out of the groove of the front fender till protruding from the front fender.

The front aux wing 21 is located on a front fender of the vehicle, and correspondingly, the first telescopic mechanism 13 is fixed on a vehicle frame between the front fenders on the two sides of the vehicle; preferably, the first telescopic mechanism 13 is fixed on a bottom plate of a vehicle frame between an engine compartment and a front pillar, or the first telescopic mechanism 13 is fixed on a vehicle body of a vehicle frame between an engine compartment and a front pillar.

In order to further raise the impact strength of the front aux wing 21, the front fenders on the two sides of the vehicle are reinforced. To be specific, a first reinforcing beam is connected between the support frames of the front fenders on the two sides of the vehicle, and the first reinforcing beam is a member additionally added to a vehicle frame or a vehicle body in a solution of the present application; the support frames of the front fenders are a part of the vehicle frame and not members additionally added to a vehicle frame or a vehicle body; an end of the front aux wing 21 nearer vehicle head is articulated to the first reinforcing beam, and an end farther from the vehicle head is connected to the front fender by means of the first elastic member so as to raise the impact strength of the front fenders on the two sides of the vehicle by means of the first reinforcing beam and subsequently raise the impact strength of the front aux wings 21; an end of the front aux wing 21 is articulated to the first reinforcing beam, and the other end is connected to the front fender by means of a first elastic member so that the front aux wing 21 revolves around the first reinforcing beam, and the front aux wing 21 extending out of the front fender is at an included angle with the front fender.

The front aux wing in this embodiment is articulated to the first reinforcing beam by means of a first articulation piece, an end of the first articulation piece is fixed to the first reinforcing beam, and the other end extends out of a reserved hole of the front fender and is connected to the front aux wing; an end of the first elastic member is fixed to the front fender, and the other end extends out of a reserved hole of the front fender and is connected to the front aux wing.

Preferably, the first articulation piece is a first slipknot holder, i.e.: an end of the front aux wing nearer the vehicle head is articulated to the first reinforcing beam by means of the first slipknot holder, the pedestal of the first slipknot holder is fixed on the first reinforcing beam, and a buckle of the first slipknot holder is connected to the front aux wing in a fixed manner.

When the first telescopic mechanism drives the front aux wing to extend out and protrude from the front fender, the first elastic member extends out along with the front aux wing; when the front aux wing retracts into a groove of the front fender, the first elastic member retracts with the front aux wing.

The telescopic assembly 1 further comprises a second telescopic mechanism 14, and correspondingly, the collision panel 2 comprises a rear aux wing 22; the rear aux wing 22 is located on a rear fender of the vehicle so as to drive the rear aux wing 22 to extend out and protrude from the rear fender by means of the second telescopic mechanism 14, and subsequently protect the rear fender being subjected to a collision or to be subjected to a collision, thereby effectively preventing the vehicle parts and components inside the rear fender from being damaged due to subjection to the collision.

Concretely speaking, the rear aux wing 22 is located in a groove of the rear fender; when the collision panel 2 is subjected to a collision, the second telescopic mechanism 14 extends out of a connection hole of a groove of the rear fender towards two sides in a transverse direction of the vehicle, and contacts and drives the rear aux wing 22 out of the groove of the rear fender till protruding from the rear fender.

The rear aux wing 22 is located on a rear fender of the vehicle, and correspondingly, the second telescopic mechanism 14 is fixed on a vehicle frame between the rear fenders on the two sides of the vehicle; preferably, the second telescopic mechanism 14 is fixed on a bottom plate of a vehicle frame between the rear seat and a rear pillar of the luggage compartment, or the second telescopic mechanism 14 is fixed on a vehicle body of a vehicle frame between the rear seat and a rear pillar of the luggage compartment.

In order to further raise the impact strength of the rear aux wing 22, the rear fenders on the two sides of the vehicle are reinforced. To be specific, a second reinforcing beam is connected between the support frames of the rear fenders on the two sides of the vehicle, the second reinforcing beam is a member additionally added to a vehicle frame or a vehicle body in a solution of the present application; the support frames of the rear fenders are a part of the vehicle frame and not members additionally added to a vehicle frame or a vehicle body; an end of the rear aux wing 22 nearer the vehicle tail is articulated to the second reinforcing beam, and an end farther from the vehicle tail is connected to the rear fender by means of the second elastic member so as to raise the impact strength of the rear fenders on the two sides of the vehicle by means of the second reinforcing beam and subsequently raise the impact strength of the rear aux wing 22; an end of the rear aux wing 22 is articulated to the second reinforcing beam, and the other end is connected to the rear fender through a second elastic member so that the rear aux wing 22 revolves around the second reinforcing beam, and the rear aux wing 22 extending out of the rear fender is at an included angle with the rear fender.

The rear aux wing in this embodiment is articulated to the second reinforcing beam by means of a second articulation piece, an end of the second articulation piece is fixed to the second reinforcing beam, and the other end extends out of a reserved hole of the rear fender and is connected to the rear aux wing; an end of the second elastic member is fixed to the rear fender, and the other end extends out of a reserved hole of the rear fender and is connected to the rear aux wing.

Preferably, the second articulation piece is a second slipknot holder, i.e.: an end of the rear aux wing nearer the vehicle tail is articulated to the second reinforcing beam by means of a second slipknot holder, a pedestal of the second slipknot holder is fixed on the second reinforcing beam, and a buckle of the second slipknot holder is connected to the rear aux wing in a fixed manner.

When the second telescopic mechanism drives the rear aux wing to extend out and protrude from the rear fender, the second elastic member extends out along with the rear aux wing; when the rear aux wing retracts into a groove of the rear fender, the second elastic member retracts with the rear aux wing.

The telescopic assembly 1 further comprises a third telescopic mechanism 15, and correspondingly, the collision panel 2 further comprises a main wing 23; the main wing 23 is located on a door outer panel of the vehicle; an end of the main wing 23 is connected to an end of the door outer panel by means of a third elastic member, and the other end is connected to the other end of the door outer panel by means of a fourth elastic member. By means of the third elastic member and the fourth elastic member, the main wing 23 is connected to the door outer panel so as to extend out or retract into the door outer panel.

Concretely speaking, the main wing 23 is located in a groove of the door outer panel; when the collision panel 2 is subjected to a collision, the third telescopic mechanism 15 extends out of a connection hole of a groove of the door outer panel towards two sides in a transverse direction of the vehicle, and contacts and drives the main wing 23 out of the groove of the door outer panel till protruding from the door outer panel; preferably, the main wing 23 extending out of the door outer panel is parallel or approximately parallel with the door outer panel.

As the main wing is located on a door outer panel of the vehicle, correspondingly the third telescopic mechanism is fixed on a vehicle frame between the door outer panels on the two sides of the vehicle; preferably, the third telescopic mechanism is fixed on a bottom plate of a vehicle frame between the central pillars on the two sides of the vehicles, or, the third telescopic mechanism is fixed on a vehicle body of a vehicle frame between the central pillars on the two sides of the vehicles.

In order to further raise the speed of the main wing for extending out of a groove of the door outer panel, the first telescopic mechanism and the second telescopic mechanism may respectively contact the main wing and drive the main wing out of a groove of the door outer panel till protruding from the door outer panel; correspondingly, the vehicle frame comprises central pillars and is provided with connection holes that can make the first telescopic mechanism and the second telescopic mechanism respectively contact the main wing; the first telescopic mechanism, the second telescopic mechanism and the third telescopic mechanism act simultaneously to do telescopic movement.

The vehicle side wing anti-collision system in this embodiment further comprises a controller. The controller is used to issue action commands ordering the telescopic pole to extend out of or retract into the operating box, or, the controller is used to issue action commands ordering the telescopic pole to extend out of or retract into the bearing frame. When the vehicle is being subjected to or is about to be subjected to a collision, the corresponding collision sensor will collect signals and issues commands through a controller to order the telescopic pole extend out of the operating box or the bearing frame to contact the collision panel and drive the collision panel to protrude from the vehicle side body; when the threat of a vehicle from subjection to a collision is dissolved, a command may be issued through a controller to order the telescopic pole to retract into the operating box or the bearing frame, or a command is issued manually to order the telescopic pole to retract into the operating box or the bearing frame.

In another optional solution of this embodiment, the vehicle side wing anti-collision system further comprises a sensor assembly, and the sensor assembly is electrically connected to the controller, and is used to generate an electrical signal and send it to the controller when the vehicle is subjected to a collision. The controller generates an action command based on the electrical signal to order the telescopic pole to extend out of or retract into the operating box or the bearing frame.

Of course, an electrical signal may be manually generated and sent to the controller; the controller generates an action command based on the electrical signal to order the telescopic pole to extend out of or retract into the operating box or the bearing frame.

The sensor assembly in this embodiment may transfer signals of a collision subjected to the vehicle by contact control method, or by the control method of intelligent induction.

In this embodiment, when the vehicle is subjected to a collision, the sensor assembly generates an electrical signal, and sends it to the controller. The controller orders the telescopic assembly to extend out towards two sides in a transverse direction of the vehicle, i.e.: orders the telescopic pole to extend out of the operating box or the bearing frame; under the drive of the telescopic assembly, the collision panel extends out of the groove of a vehicle side body, protrudes from the vehicle side body and forms protection layers on the two sides of the vehicle to protect the vehicle and people inside the vehicle; when the threat of a vehicle from subjection to a collision is dissolved, the sensor assembly generates an electrical signal and sends it to the controller. The controller orders the telescopic assembly to retract towards two sides in a transverse direction of the vehicle, i.e.: orders the telescopic pole to retract into the operating box or the bearing frame; then the collision panel controls an elastic member to retract into the groove of the vehicle side body through elastic deformation restoring force of the elastic member, or through the controller.

The controller in this embodiment is electrically connected to the first telescopic mechanism, the second telescopic mechanism and the third telescopic mechanism respectively to drive the front aux wing, the rear aux wing and the main wing independently out of the vehicle side body. The first telescopic mechanism, the second telescopic mechanism, the third telescopic mechanism may be started in the same time to drive the front aux wing, the rear aux wing and the main wing simultaneously out of the vehicle side body; or, the first telescopic mechanism, the second telescopic mechanism and the third telescopic mechanism are started in turn to drive the front aux wing, the rear aux wing and the main wing out of the vehicle side body in turn. Preferably, the first telescopic mechanism, the second telescopic mechanism and the third telescopic mechanism are started simultaneously and contact the main wing, the front aux wing and the rear aux wing simultaneously; the main wing, the front aux wing and the rear aux wing extend out of the vehicle frame in the same time to form an integral protective body; preferably, the integral protective body is a seamlessly and smoothly connected arc-shaped protective body, or an approximately arc-shaped protective body; the first telescopic mechanism, the second telescopic mechanism and the third telescopic mechanism retract in the same time, and the main wing, the front aux wing and the rear aux wing simultaneously retract into respective grooves of the vehicle frame.

As shown in FIG. 3, the slipknot holder 3 in this embodiment comprises a pedestal 31 and a buckle 32, which are connected with bolts 33; the first slipknot holder and the second slipknot holder adopt a structure of the slipknot holder.

The elastic member in this embodiment comprises the first elastic member, the second elastic member, the third elastic member and the fourth elastic member, and may be without limitation mechanical expansion links, hydraulic expansion links, pneumatic expansion links and springs; preferably, a combination of a mechanical expansion link and a compression spring is adopted, in other words, the compression spring is sleeved on the outer circumference of the mechanical expansion link.

To be specific, the elastic member always tends to take the collision panel back into a groove of the vehicle side body; the telescopic assembly offsets the tensile force of elastic deformation of the elastic member, and drives the collision panel out of the vehicle side body; when the telescopic assembly retracts, i.e.: the telescopic assembly withdraws a thrust that makes the collision panel extend out of the vehicle side body, the collision panel retracts into a groove of the vehicle side body under the pull of the elastic member for restoration of elastic deformation.

The vehicle frame in this embodiment comprises front pillars, central pillars and rear pillars on the two sides of the vehicle. Holes shall be reserved in them so that the telescopic pole of the telescopic assembly contacts the collision panel, i.e.: the first telescopic mechanism, the second telescopic mechanism and the third telescopic mechanism respectively contact corresponding collision panel, wherein the front pillars, central pillars and rear pillars on the two sides of the vehicle may be widened to cater for the need of drilling.

Maximum efforts should be made to prevent the addition of the vehicle side wing anti-collision system from changing the appearance of the vehicle, car in particular; as the appearance design of most cars meets aerodynamic requirements to reduce the coefficient of air resistance, the telescopic assembly and the collision panel are installed in the vehicle in a concealed manner. In order to cater for concealed installation of the telescopic assembly and the collision panel in the vehicle, the vehicle needs to adopt brand-new design to receive the telescopic assembly and the collision panel; the components that need to adopt brand new design include: front fender, rear fender and door outer panel. These components adopt new groove design and provide a space to receive a collision panel of the vehicle. The size of the grooves tallies with seamless design, and their depth conforms to concealment design, and the grooves of the front fender, rear fender and door outer panel are consistent; corresponding holes should be reserved for the door lock position of the door outer panel and the position of a fuel tank door to ensure their functions are not affected by new design.

The collision panel in this embodiment is designed in three sections, i.e.: main wing, front aux wing and rear aux wing; as the three locations all have respective built-in structures, functional deployments and position conditions, means of treatment by section is needed, but they have a same technical purpose, which is protection of the exterior of the vehicle body. Besides, they shall also meet the corresponding conditions of each location, such as: door opening/closing conditions. Therefore, this solution divides the collision panel into three sections, and applies the characteristics of different protective components to adapt to the technical effect of protection of three locations under three different conditions, without losing the original functions of the front fender, rear fender and vehicle door.

The collision panel in this embodiment comprises the main wing, the front aux wing and the rear aux wing; the shape structure of the collision panel, i.e.: the shape structure of the main wing, the front aux wing, the rear aux wing may be, without limitation, a crescent or flat shape, or other shapes designed by the manufacturer, while the material may be, without limitation, metal, composite material or other materials with strong impact resistance, or a solid cast; flexible material, such as: rubber and composite material, may be attached to the external surfaces of the main wing, the front aux wing and the rear aux wing, i.e.: the surfaces subjected to a collision, in order to strengthen the effect of absorption of impact force; as the overall dimensions of the front fenders and rear fenders of most vehicles are smaller than the overall dimensions of door outer panels, the front aux wing located in a groove of the front fender and the rear aux wing in a groove of the rear fender, preferably, adopt rectangular plates of a same size; the main wing located in the door outer panel adopts two said rectangular plates. The two rectangular plates are placed on the door outer panel vertically.

The range of protrusion of the main wing, the front aux wing, the rear aux wing in this embodiment does not exceed the height of the external rear view mirrors of the vehicle; after protrusion, the main wing, the front aux wing and the rear aux wing are arranged into an arc-shaped or approximately arc-shaped protection layer.

Embodiment 2

Embodiment 2 provides a vehicle side wing anti-collision system. This embodiment is another technical solution improving the door outer panel, main wing and their connective relations on the basis of Embodiment 1. Other technical features disclosed by Embodiment 1 except the door outer panel, main wing and their connective relations are also applicable to this embodiment, and will not be described again.

Figure 4:
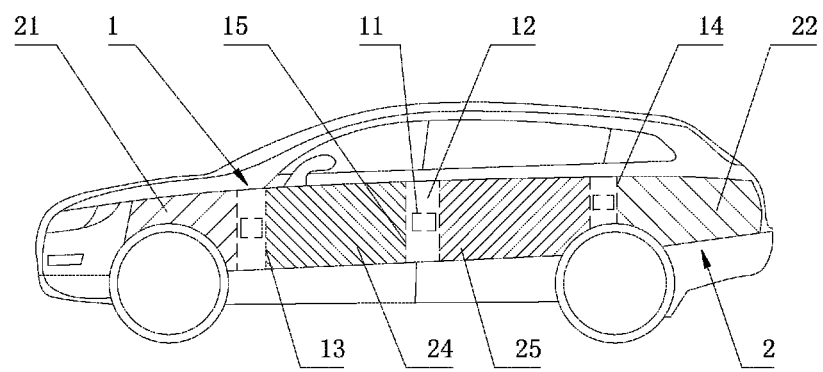
FIG. 4 is a front view of a vehicle side wing anti-collision system provided by Embodiment 2 of the present invention.

FIG. 4 is a front view of a vehicle side wing anti-collision system provided by this embodiment. The section lines in the diagram are not for expressing section lines but for more clearly indicating front aux wing, rear aux wing, front main wing, rear main wing and other structures.

As shown in FIG. 4, the door outer panel in this embodiment comprises a front door outer panel and a rear door outer panel, the main wing 23 comprises a front main wing 24 and a rear main wing 25, in other words, it applies to a vehicle with four doors; the third telescopic mechanism 15 is fixed to a bottom plate of a vehicle frame corresponding to the central pillars on the two sides of the vehicle; an end of the front main wing 24 is connected to an end of the front door outer panel by means of a fifth elastic member, and the other end is connected to the other end of the front door outer panel by means of a sixth elastic member; an end of the rear main wing 25 is connected to an end of the rear door outer panel by means of a seventh elastic member, and the other end is connected to the other end of the rear door outer panel by means of an eighth elastic member. The connection of the front main wing 24 and the front door outer panel by means of the fifth elastic member and the sixth elastic member enables the front main wing 24 to extend out of or retract into the front door outer panel; the connection of the rear main wing 25 and the rear door outer panel by means of the seventh elastic member and the eighth elastic member enables the rear main wing 25 to extend out of or retract into the rear door outer panel; the extension of the front main wing 24 out of the front door outer panel, and the extension of the rear main wing 25 out of the rear door outer panel protect a vehicle with four doors.

Concretely speaking, the front main wing 24 is located in a groove of the front door outer panel, and the rear main wing 25 is located in a groove of the rear door outer panel; when the collision panel 2 is subjected to a collision, the third telescopic mechanism 15 extends out of a connection hole of a groove of the front door outer panel and a connection hole of a groove of the rear door outer panel towards two sides in a transverse direction of the vehicle respectively, and respectively contacts and drives the front main wing 24 out of a groove of the front door outer panel, and the rear main wing 25 out of a groove of the rear door outer panel; preferably, the front main wing 24 extending out of the front door outer panel is parallel or approximately parallel with the front door outer panel, and the rear main wing 25 extending out of the rear door outer panel is parallel or approximately parallel with the rear door outer panel.

In order to further raise the speed of the front main wing for extending out of a groove of the front door outer panel, the first telescopic mechanism may also contact the front main wing and drive it out of a groove of the front door outer panel till protruding from the front door outer panel; correspondingly, the vehicle frame comprises central pillars and is provided with a connection hole that can make the first telescopic mechanism contact the front main wing; the first telescopic mechanism, the second telescopic mechanism and the third telescopic mechanism act simultaneously to do telescopic movement.

In order to further raise the speed of the rear main wing for extending out of a groove of the rear door outer panel, the second telescopic mechanism may also contact the rear main wing and drive it out of a groove of the rear door outer panel till protruding from the rear door outer panel; correspondingly, the vehicle frame comprises central pillars and is provided with a connection hole that can make the second telescopic mechanism contact the rear main wing; the first telescopic mechanism, the second telescopic mechanism and the third telescopic mechanism act simultaneously to do telescopic movement.

Figure 5:
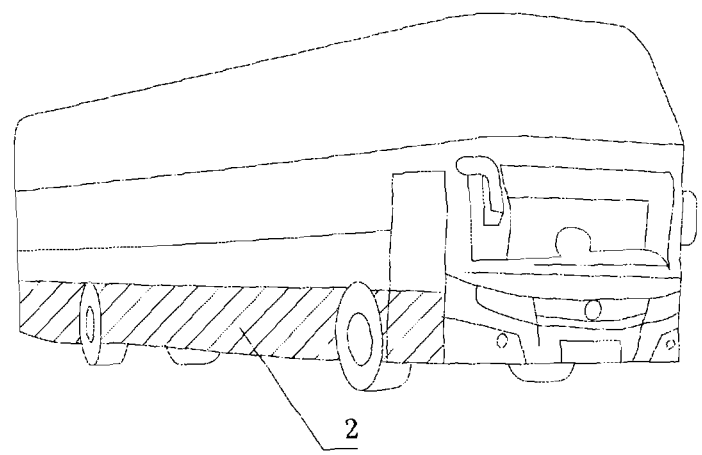
FIG. 5 is a perspective view of a vehicle side wing anti-collision system provided by a modified embodiment of the present invention (collision panel)
Figure 6:
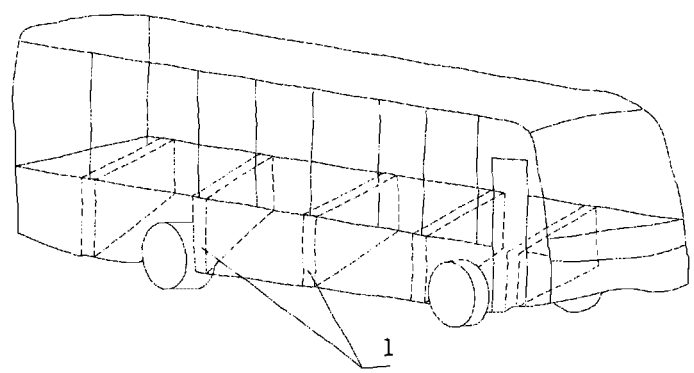
FIG. 6 is a perspective view of a vehicle side wing anti-collision system provided by a modified embodiment of the present invention (telescopic assembly)

The vehicle side wing anti-collision system in this embodiment may also be applied on large buses. The installation positions and installation methods of the telescopic assembly and the collision panel may be adaptively modified on the basis of Embodiment 1 or Embodiment 2. The technical solutions modified based on the above train of thought are also protective content of this technical solution. Below a modification is illustrated:

FIG. 5 and FIG. 6 are stereo-structural diagrams of a vehicle side wing anti-collision system provided by this modified embodiment. The section lines in the diagram are not for expressing section lines but for more clearly indicating the structure of a collision panel; the dotted line is FIG. 6 denotes the telescopic assembly.

As shown in FIG. 5 and FIG. 6, the collision panel 2 is located in a groove of a vehicle side body; concretely speaking, as the vehicle side body of a large bus is large, and the collided location is in the lower part of the vehicle side body in general, so the collision panel 2 is located in a groove in the lower part of a vehicle side body so as to provide better protection for the vehicle.

Correspondingly, the telescopic assembly 1 is fixed to the lower part of vehicle frame; taking a long-distance bus with a luggage compartment and a passenger compartment for example, the telescopic assembly 1 is fixed on a vehicle frame between the luggage compartment and the passenger compartment, extends out of a connection hole of the groove towards two sides in a transverse direction of the vehicle, and drives the collision panel 2 out of the groove till protruding from the vehicle side body.

The set quantity of the collision panels and the telescopic assemblies depends on the length of the vehicle. Preferably, five collision panels and five telescopic assemblies are set.

It should be noted that the above embodiments are intended to describe the technical solutions of the present invention and not to limit them. Although the present invention is described in details by referring to the foregoing embodiments, those skilled in the art should understand that they may still make modifications to the technical solutions recorded in the foregoing embodiments, or equivalent replacements to some or all of the technical features. These modifications or replacements do not make the essence of the corresponding technical solutions depart from the scope of the technical solutions of the embodiments of the present invention.

What is claimed is:

1. A vehicle side wing anti-collision system, comprising:
a telescopic assembly fixed on a vehicle frame; and
a collision panel located in a groove of a vehicle side body and provided correspondingly to the telescopic assembly;
wherein the groove is provided with a connection hole, and the telescopic assembly is extended out of the connection hole towards two sides in a transverse direction of the vehicle to drive the collision panel to extend out of the groove till protruding from the vehicle side body when the collision panel is subjected to a collision;
and wherein the telescopic assembly comprises a first telescopic mechanism, and the collision panel comprises a front aux wing correspondingly which is located on a front fender of the vehicle;
and wherein the telescopic assembly further comprises a second telescopic mechanism and the collision panel comprises a rear aux wing correspondingly which is located on a rear fender of the vehicle;
and wherein the telescopic assembly further comprises a third telescopic mechanism, and the collision panel further comprises a main wing correspondingly which is located on a door outer panel of the vehicle; and
wherein an end of the main wing is connected to an end of the door outer panel by a third elastic member, and the other end is connected to the other end of the door outer panel by a fourth elastic member;
wherein the door outer panel comprises a front door outer panel and a rear door outer panel and the main wing comprises a front main wing and a rear main wing;
and wherein the third telescopic mechanism is fixed on a vehicle frame bottom plate to which center pillars on two sides of the vehicle correspond;
and wherein an end of the front main wing is connected to an end of the front door outer panel by a fifth elastic member, the other end is connected to the other end of the front door outer panel by a sixth elastic member; and an end of the rear main wing is connected to an end of the rear door outer panel by a seventh elastic member, the other end is connected to the other end of the rear door outer panel by an eighth elastic member.

2. The system according to claim 1, wherein the collision panel protruding from the vehicle side body is arranged to shape as an arc.

3. The system according to claim 1, wherein the telescopic assembly comprises a telescopic pole and an operating box connected to the vehicle frame in a fixed manner; and the telescopic pole is located in the operating box, which is trended to extend out of the operating box along its axial direction;
or, the telescopic assembly comprises a telescopic pole and a bearing frame connected to the vehicle frame in a fixed manner; and the telescopic pole is located in the bearing frame, which can be able to extend out of the bearing frame along its axial direction.

4. The system according to claim 3, wherein the operating box comprises:
a box body,
a pneumatic cylinder disposed in the box body; and
a pneumatic transmission pole disposed in the box body, an end which is connected to the pneumatic cylinder and the other end is connected to the telescopic pole; and wherein the pneumatic cylinder is able to drive the telescopic pole to extend out of the box body in an axial direction of the telescopic pole by means of the pneumatic transmission pole.

5. The system according to claim 3, wherein the bearing frame comprises a frame body connected to the vehicle frame in a fixed manner, in which a division plate, a motor, a connecting rod having a rammer secured thereon in a fixed manner, a spring and an electric trigger are provided; the division plate and the motor being respectively connected to the frame body in a fixed manner;
the motor being able to drive the connecting rod to approach the division plate;
an end of the spring being fixed on the division plate and the other end being connected to the connecting rod by means of the electric trigger;
an elastic member corresponding to the telescopic pole being disposed in the groove; the elastic member farther from one end of the frame body being connected to the collision panel in a fixed manner, allowing that the collision panel can be always trended to retract into the groove;
a pole spring being sleeved outside the telescopic pole, allowing that the telescopic pole can be always trended to retract into the frame body;
the electric trigger driving the connecting rod away from the division plate by means of the spring when the collision panel is subjected to a collision so that the rammer contacts the telescopic pole and drives the telescopic pole out of the frame body and consequently the collision panel extends out of the groove till protruding from the vehicle side body;
a bearing and reinforcing body being disposed in the frame body which is disposed on a side of the rammer farther from the telescopic pole; wherein the rammer is able to move with the connecting rod along the bearing and reinforcing body.

6. The vehicle side wing anti-collision system according to claim 3, wherein the telescopic assembly further comprises a controller for controlling the telescopic pole to extend out of or retract into the operating box or the bearing frame.

7. The vehicle side wing anti-collision system according to claim 6, further comprising a sensor assembly which is electrically connected to the controller, and used to generate an electrical signal and send it to the controller when the vehicle is subjected to a collision.

8. The vehicle side wing anti-collision system according to claim 1, wherein a first reinforcing beam is connected between support frames of the front fenders on the two sides of the vehicle; and wherein an end of the front aux wing nearer the vehicle head is articulated to the first reinforcing beam, and an end of the front aux wing farther from the vehicle head is connected to the front fender by the first elastic member.

9. The vehicle side wing anti-collision system according to claim 1, wherein a second reinforcing beam is connected between support frames of the rear fenders on the two sides of the vehicle; and wherein an end of the rear aux wing nearer the vehicle tail is articulated to the second reinforcing beam, and an end farther from the vehicle tail is connected to the rear fender by the second elastic member;
and wherein the front fender of the vehicle includes a groove receiving the front aux wing, the rear fender of the vehicle includes a groove receiving the rear aux wing, and the door outer panel includes a groove receiving the main wing.

10. The vehicle side wing anti-collision system according to claim 1, wherein after the front aux wing, the main wing and the rear aux wing are arranged into a seamlessly and smoothly connected integral arc-shaped protective body after they protrude from the vehicle side body.

11. The vehicle side wing anti-collision system according to claim 1, wherein the telescopic assembly further comprises a controller which is electrically connected to the first telescopic mechanism, the second telescopic mechanism and the third telescopic mechanism respectively so as to drive the front aux wing, the rear aux wing and the main wing to independently extend out of the vehicle side body.

12. The vehicle side wing anti-collision system according to claim 1, wherein the area of the collision panel is no less than 20% of the area of the corresponding vehicle side body.

* * * * *